No. 12,757. REISSUED MAR. 3, 1908.

F. E. SEELEY.

INCANDESCENT LAMP SOCKET.

APPLICATION FILED JAN. 22, 1908.

WITNESSES

Walter Abbe

M. E. Keir

INVENTOR

Frank E. Seeley

BY

Howson and Howson

ATTORNEYS

UNITED STATES PATENT OFFICE.

FRANK E. SEELEY, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

INCANDESCENT-LAMP SOCKET.

No. 12,757. Specification of Reissued Letters Patent. Reissued March 3, 1908.

Original No. 839,655, dated December 25, 1906, Serial No. 324,919. Application for reissue filed January 22, 1908. Serial No. 412,222.

*To all whom it may concern:*

Be it known that I, FRANK E. SEELEY, a citizen of the United States of America, residing in the city of Bridgeport, in the county of Fairfield, in the State of Connecticut, have invented certain new and useful Improvements in Incandescent - Lamp Sockets, of which the following is a specification.

My invention relates to incandescent lamp sockets and the like, and particularly to the means of fastening together the shell and the cap, the object of my invention being to provide a ready and secure means whereby the parts may be attached or loosened.

Figure 1:
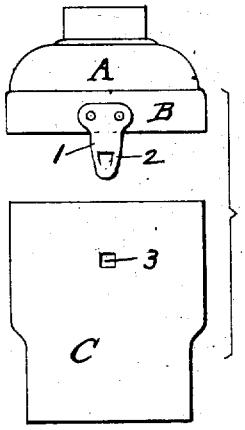
Figure 2:
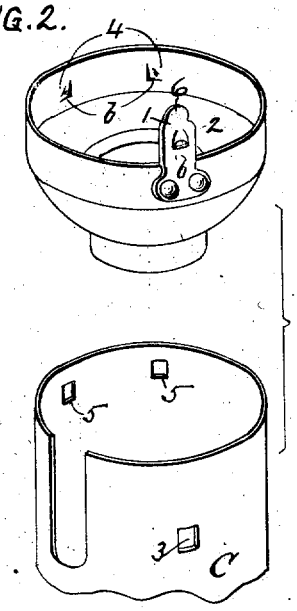
Figure 4:
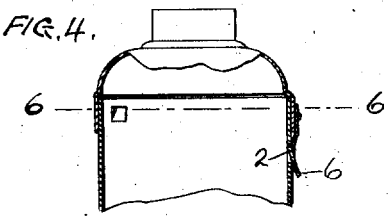
Figure 6:
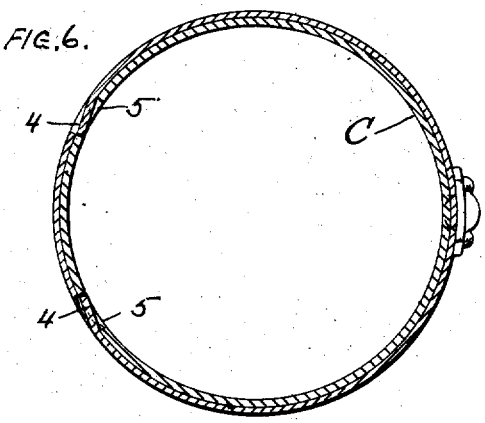
Figure 5:
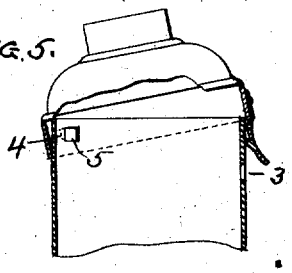
Figure 3:
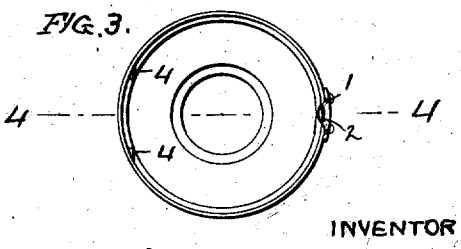

In the accompanying drawings Figure 1 is a side view of the cap and shell detached; Fig. 2 is a perspective view of the same with the cap inverted; Fig. 3 is an interior view of the cap; Fig. 4 is a cross section on the line 4—4, Fig. 3; Fig. 5 is a cross section on the same line but showing the cap tilted back preparatory to removal; Fig. 6 is an enlarged cross section on the line 6—6, Fig. 4; and Fig. 7 is a side elevation of a modification of the cap.

Referring to the drawings, the cap A and the shell C are made of any suitable material but preferably of the usual drawn sheet metal. The cap is provided with the usual circumferential flange B within which the shell fits when the parts are attached.

Figure 7:
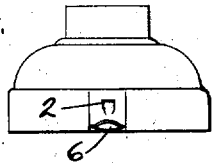

My fastening device is as follows:—A spring tongue 1 is attached to the cap rim by rivets or otherwise, as shown in Fig. 1, or is cut from the rim as shown in Fig. 7. This tongue is provided on its inner face with a projection 2 forming a beveled catch which may be conveniently stamped from the tongue itself.

At points on the rim of the cap approximately opposite to the tongue are provided two adjacent angled projections 4 facing in opposite directions, each having one side approximately parallel to the axis of the socket and one side in a plane approximately at right angles to said axis. These projections may be conveniently made by stamping the same from the inner face of the rim of the cap, as shown in the drawings.

In the shell at appropriate points are provided holes 5 of suitable shape to receive the projections 4 on the rim and a hole 3 to receive the projection 2 on the tongue.

When the cap is fitted upon the shell the projections carried by the cap latch into the corresponding holes in the shell, and the cap cannot thereafter be either rotated or moved except as hereinafter explained. The rotation of the cap is prevented by the opposition of the face of one or other of the holes 5 to the face *a* of one or other of the angled projections, 4, whichever way the cap may be turned, while the faces *b* of these projections 4 and 2 prevent the shell from being removed endwise from the cap. The shell may be removed, however, if the tongue 1 carrying the projection 2 be first sprung away from the shell by means of the finger or any instrument inserted under the flared end 6 of the tongue and the projection 2 thus lifted free of the hole 3. The cap may be then tilted back until the faces of the angled projections 4 are clear of the holes 5. The cap is thereby entirely freed and may be removed at will.

I claim as my invention

1. An incandescent lamp socket, having a flanged cap and a shell, adapted to fit within the flange of the cap, and means for attaching the shell and cap together, said means including two oppositely faced angled projections formed directly on one part while the other part has holes to receive the said projections.

2. An incandescent lamp socket, having a flanged cap and a shell, adapted to fit within the flange of the cap, and means for attaching the shell and cap together, said means including two oppositely faced angled projections formed directly on one part, while the other part has holes to receive said projections in combination with an additional latching means preventing endwise motion of the shell in the cap.

3. In incandescent lamp sockets, the combination of a shell with the cap, and means for attaching the shell and cap together, consisting of a spring tongue carrying the beveled catch borne by one part and faced angled projections borne by one part, the other part having holes to receive the angled projections and the beveled catch.

4. An incandescent lamp socket, having a cap provided with oppositely faced angled projections on the inner face of the rim, a tongue provided on its inner face with a beveled catch, and a shell provided with holes suitably placed to receive the angled projections and the beveled catch when the cap and shell are fitted together.

In testimony whereof I have signed my name to this application, in the presence of two subscribing witnesses.

F. E. SEELEY.

Witnesses:
G. W. GOODRIDGE,
M. BURTIS.